US005762830A

United States Patent [19]

Long et al.

[11] Patent Number: 5,762,830
[45] Date of Patent: Jun. 9, 1998

[54] ELECTRONICALLY AND THERMALLY CONDUCTING COMPOSITIONS FOR ACTUATORS

[75] Inventors: Barbara J. Long, Linden; M. Ishaq Haider, Bernardsville; Joseph D. Menczel, Somerset; James B. Stamatoff, Westfield, all of N.J.

[73] Assignee: Hoechst Celanese Corporation, Somerville, N.J.

[21] Appl. No.: 547,043

[22] Filed: Oct. 23, 1995

[51] Int. Cl.$^6$ .............................. H01B 1/22; C08L 91/06
[52] U.S. Cl. ..................... 252/512; 252/500; 252/510; 252/514; 106/272
[58] Field of Search ..................... 252/510, 500, 252/514, 512; 106/272; 208/21; 204/107

[56] References Cited

U.S. PATENT DOCUMENTS

| | | | |
|---|---|---|---|
| 2,702,756 | 2/1955 | Kurlandsky et al. | 106/272 |
| 3,186,230 | 6/1965 | Scherer | 73/368.3 |
| 3,187,577 | 6/1965 | Scherer | 73/368.3 |
| 3,234,793 | 2/1966 | Vernet | 73/368.3 |
| 3,403,560 | 10/1968 | Lipscombe | 73/368.3 |
| 3,607,332 | 9/1971 | Wingfield | 106/272 |
| 3,688,582 | 9/1972 | Gradishar | 73/371 |
| 3,778,288 | 12/1973 | Ridge et al. | 106/272 |
| 4,098,652 | 7/1978 | Koenig | 204/4 |
| 5,006,397 | 4/1991 | Durand | 428/209 |
| 5,075,038 | 12/1991 | Cole et al. | 252/514 |
| 5,106,415 | 4/1992 | Davidian | 106/14.24 |
| 5,177,969 | 1/1993 | Schneider | 60/527 |
| 5,183,593 | 2/1993 | Durand et al. | 252/514 |
| 5,366,664 | 11/1994 | Varadan et al. | 252/512 |

FOREIGN PATENT DOCUMENTS

| | | | |
|---|---|---|---|
| 0 162 979 A1 | 12/1985 | European Pat. Off. | H01B 1/22 |
| 0 409 099 A2 | 1/1991 | European Pat. Off. | H01B 1/22 |
| WO 84/02423 | 6/1984 | WIPO | H01B 1/22 |
| WO 91/20088 | 12/1991 | WIPO | H01C 10/30 |

OTHER PUBLICATIONS

Patent Abstract of Japan, vol. 013, No. 169 (C–587) 21 Apr. 1989 & Jp 63 317541A (Mitsubishi Corp) 26 Dec. 1988.

Z. Lang et al. Journal of Intelligent Material Systems and Structures, vol. 5, Nov. 1994, pp. 758–763

K. Uchino, The Encyclepedia of Advanced Materials, vol. 1, Pergamon Press, Elsevier Science, Inc., Tarrytown, New York 1994, pp. 30–35.

M.R. Kamal et al., Advances in Polymer Technology, vol. 3 (No. 2), 1983 p.89.

"Vernatherm, Thermal Controls" from Rostra Engineered Components, Vernatherm Division, Bristo, Connecticut, 1989.

*Primary Examiner*—Mark Kopec
*Attorney, Agent, or Firm*—Palaiyur S. Kalyanaraman

[57] ABSTRACT

This invention discloses a thermally expandable composition for use in actuators. The composition contains about 10–50 volume percent hollow glass spheres in a wax or a polymer. The spheres contain a conducting coating affixed thereon. During use in an actuator, the composition is heated to melt the wax or polymer, when the density of the spheres substantially match the density of the melt, thereby substantially eliminating phase separation. The high thermal conductivity of the composition increases the speed of heat transfer out of the composition during the cooling cycles.

12 Claims, No Drawings

ELECTRONICALLY AND THERMALLY CONDUCTING COMPOSITIONS FOR ACTUATORS

BACKGROUND OF THE INVENTION

This invention relates to the field of electrically and thermally conducting compositions for actuators. The compositions comprise a thermally expandable material and an additive that is electrically and/or thermally conductive which then causes the thermal expansion.

Actuators are generally devices that produce some mechanical motion in repetitive expansion-contraction cycles. While actuators are of many types, certain types of actuators such as ceramic actuators, piezoelectric actuators and the like are described in some detail by K. Uchino, *The Encyclopedia of Advanced Materials*, Vol. 1, pp. 30–35, Pergamon Press, Elsevier Science Inc., Tarrytown, N.Y. (1994). Many actuators use an expandable material as part of their motion-producing action. Expansion is usually achieved by electrical or thermal heating of the expandable material, while contraction is generally achieved by heat transfer out of the expandable material. A commonly used thermally expandable material is a type of wax, although plastics and metals have also been employed in actuators and similar devices that use expandable materials. Waxes have the advantages of a broad range of melting points, and a volume expansion ("$\Delta V$") that occurs at the operating temperatures.

The term wax refers to a substance that is a plastic solid at room temperature and melts to form a relatively low viscosity liquid. Waxes are generally a complex combination of organic compounds, especially long-chained organic acids, esters and hydrocarbons. Waxes include beeswax, waxes taken from plants (e.g., carnauba wax, bayberry wax, and the like), and mineral waxes derived from petroleum or coal. Montan wax is an example of the latter, being derived by solvent extraction of lignite. Paraffin is a well-known type of petroleum wax, obtained by crude oil distillation/separation.

Low molecular weight (about 10,000 g/mole or less) hydrocarbon polymers also form waxes, especially polyethylene and polypropylene waxes; these waxes may be made by polymerization or obtained by thermally degrading higher molecular weight polymers. Unlike other waxes, these polymers tend to contain molecules that are of the same type, although as in all waxes the molecular weights of the molecules vary.

The exact composition of any type of wax varies based on the origin of the wax and the treatment it has undergone. Waxes of the same type may vary in purity, color, melting point, hardness, and other properties and characteristics. In an actuator containing an expandable material, e.g., wax, the wax expands during the melting process, and the volume expansion drives a piston, and finally the movement of the piston is transferred into some kind of mechanical motion ("actuation"). Operating temperature and degree of expansion are significant factors in actuator performance, but in many applications the speed of expansion and contraction is also important. In a thermally expandable material, for example, the speed depends on how rapidly heat can be transferred into and out of the thermally expandable material, which depends in large part on the thermal conductivity of the material, as well as the technique used to heat the material.

Common methods of heating the material to expand is electrical or thermal. The disadvantage of many materials, including common waxes, is that they are electrical and thermal insulators, i.e., the electrical and thermal conductivity is low. In an electrically heated actuator, the low value of electrical conductivity of the wax sets a limit to the heating power, thus limiting the heating, which in turn limits the actuation rate. At the same time, the low thermal conductivity limits the cooling, thus limiting the deactivation rate.

Schneider (U.S. Pat. No. 5,177,969) recognized the need for rapid heat transfer, and addressed this problem by designing the actuator so that the material was contained in thin passages, increasing the surface area exposed to heating or cooling. However, this may not be a practical design in all actuators, and does not improve the thermal conductivity of the material itself.

A study of thermally expandable polymers is reported by Z. Jang and Z. J. Zhang in "Thermally- and Phase Transformation-Induced Volume Changes of Polymers for Actuator Applications", *Journal of Intelligent Material Systems and Structures*, Vol. 5, November 1994, pp. 758–763.

Several workers have used metal powders or carbon black to increase thermal conductivity in thermally expandable materials. U.S. Pat. Nos. 3,186,230, 3,187,577, 3,234,793, and 3,403,560 teach combining metal powders with thermally expandable materials for use in thermo-actuators. U.S. Pat. No. 3,688,582 teaches adding carbon black to the thermally expandable material in a thermometer to improve visibility and/or heat conductivity. Copending patent application, Ser. No. 08/546,649 now abandoned, filed of even date herewith, discloses wax compositions containing graphite particles that have significantly improved thermal conductivity.

Another technique may be to add a metal powder to the wax. Addition of highly conductive metal powder may benefit raising both thermal and electrical conductivity. However, the disadvantage of adding metal powder to the wax is that it separates from the wax due to the much higher density of the metal powder when the wax melts, especially during the repetitive heating-cooling cycles.

Thus, it is an object of the present invention to provide a highly thermally expandable composition for actuators.

It is another object of this invention to provide a highly thermally conductive expandable composition for actuators.

It is another object of this invention to provide a highly electrically conductive expandable composition for actuators.

It is a further object of the present invention to provide an actuator having a rapid response time.

It is yet another object of the present invention to provide an expandable composition which comprises a uniformly blended mixture of an expanding ingredient and a conducting ingredient whose densities are substantially matched when the composition is heated to melt the expanding ingredient so that the ingredients do not separate when heated.

It is still another object of the present invention to provide an actuator which comprises a uniformly blended mixture of an expanding ingredient and a conducting ingredient whose densities are substantially matched during the functioning of the actuator.

It is a further object of the present invention to provide actuators comprising waxes with additives with increased electrical and thermal conductivities without phase separation when the wax melts during the functioning of the actuator.

Other objects and advantages of the present invention will be apparent to those skilled in the art from the following description and the appended claims.

SUMMARY OF THE INVENTION

One or more objects of the present invention are achieved by the provision of an expandable composition for use in actuators, comprising a wax or polymer, and a sufficient amount of suitable objects, defined below, which objects are affixed to a suitable electrical or thermal conducting material, such that the expandable composition possesses high thermal and electrical conductivity. During the heating-cooling cycles of the actuator there is substantial matching of the density of the objects and the density of the molten or semi-molten wax or polymer without phase separation. "Suitable objects" are forms of materials such as, for example, hollow spheres, solid spheres, fibers, fibrils, powder and the like, made of glass, metal, plastic, ceramic and the like. The term "affixed" refers to intimate contact, continuous attachment (such as, for example, a uniform coating), or discontinuous attachment (such as, for example, glued-on pieces of the conducting material on said object). A discontinuous attachment provides thermal conductivity, while a continuous coating provides both electrical and/or thermal conductivity. The conducting material coating on the spheres is preferably a metal coating, such as, for example, silver, aluminum and the like. Spheres are the most preferred form of the "suitable objects", although the other forms referred to above are also to be considered in a similar fashion.

The expandable composition generally contains about 10–50 volume percent of the spheres dispersed in the wax or polymer. The spheres generally have a diameter range of between about 10 μm to about 0.5 mm, and a density range of about 0.6 to 0.9 g/cm$^3$. The spheres containing the conductive affixture provide means for electrical and/or thermal heating of the inventive composition. The wax or polymer then melts under the heating, causing the expansion. At the same time, the substantial matching of density of the spheres and of the molten wax prevents phase separation or agglomeration. During cooling, the spheres, due to their high thermal conductivity, cause rapid heat transfer out of the composition, resulting in contraction upon crystallization. In a typical experiment, a 50:50 (volume ratio) of silver-coated hollow glass spheres with an average density of 0.847 g/cm$^3$ and Montan wax E (from Hoechst AG, Frankfurt, Germany) was used as the expandable composition; increased electrical conductivity as well as thermal conductivity was demonstrated for the composition, which also showed no phase separation over at least ten cycles; there was substantial matching of density between the hollow spheres and the molten wax of density about 0.85 g/cm$^3$, during the expansion process.

DETAILED DESCRIPTION OF THE PREFERRED EMBODIMENTS

The present invention discloses compositions comprising wax or polymer and suitable objects which have been affixed with a conducting material. The terms "suitable objects", "affixed" and "conducting material" are defined above. The description below uses hollow spheres as the suitable objects. The spheres have diameters generally in the range of about 10 μm to about 0.5 mm and are present in the wax or polymer in amounts of about 10–50 volume percent. The conducting material is preferably a uniform coating on the spheres, with a coating thickness generally in the range of about 0.4–0.7 μm on the spheres. The spheres themselves are made of ceramic, metal, plastic or glass, preferably glass, while the conductive coating may be any coating, for example metal, carbon etc., that is conductive, is uniformly coated on the spheres, and results in suitable density for the coated sphere. Metal coatings are preferred such as, for example, silver, copper, aluminum, gold and the like, as well as mixtures thereof. Many such coated spheres are commercially available, for example, the Metalite Silver SF-20® brand silver-coated hollow glass spheres available from PQ Corporation, Valley Forge, Pa. The following description illustrates the invention wherein the spheres are hollow glass spheres containing a silver coating of thickness in the range 0.4–0.7 μm and wax is the expandable constituent. Other additives such as, for example, stabilizers, nucleating agents, softeners, viscosity modifiers and the like may also be used in the expandable composition. Typical stabilizers of use may be anti-oxidants many of which are commercially available under the trade names Irganox 1010®, Irganox 1425®, Weston 618® and Ultranox U626®.

In one preferred embodiment of the present invention, 50% by volume silver-coated hollow glass spheres described above, are blended with a suitable wax in a suitable container to substantially uniformly disperse the spheres in the wax. (Because of matched densities, the volume ratio and the weight ratio are substantially the same and the two terms are interchangeable in this disclosure.) The mixture is then heated to temperatures of between about 50°–150° C., depending on the thermal stability of the ingredients, and then allowed to cool to ambient temperatures. ("Ambient temperatures" refers to temperatures in the range 20°–28° C.) Its thermal and electrical conductivity values are then determined by techniques well known to those skilled in the art. In a typical experiment, 50 grams of the Metalite Silver SF-20® brand spheres were taken together with 50 grams of the Montan Wax E (density of melted wax 0.85 g/cm$^3$) in a glass beaker and mixed well. The mixture was then heated on a hot plate to about 110° C. with stirring whereupon the wax melted. The solution was then allowed to cool to ambient temperatures, whereupon a uniformly dispersed solid mixture was obtained. The resulting composition was found to have a high electrical conductivity (low resistance of about 1 ohm-cm) in the state of melt (about 120° C.), which is substantially higher than that of wax alone which is an insulator. The thermal conductivity of the composition, as measured by the flux method described by M. R. Kamal et al, *Advances in Polymer Technology*, Vol. 3 (No. 2), 89 (1983), was found to be 0.3 watts/(meter °C.) at ambient temperatures, which is three times that of wax alone.

This composition can be used in actuators that require a thermally expandable material such as a wax or other material. The composition of the present invention produces a much faster response time for the actuator because the wax can be heated or cooled much more rapidly due to its enhanced thermal transfer rate compared to wax without the spheres. The composition further provides a unique method of matching substantially the density of the wax or polymer by the hollow metal spheres when the wax or polymer (the expanding/contracting ingredient) is in the molten or semi-molten state during the actuating process.

Although spheres are the most preferred form of the objects in the practice of the present invention, other suitable forms may be employed, such as fibers or fibrils, as stated above and as will be known to those skilled in the art. For example, incorporation of nano-size carbon fibrils/whiskers in a wax matrix forms a molecularly dispersed high conductive network ("percolation") which substantially increases the thermal conductivity of the composition. Such composition provides thermal conductivity enhancement with even small amounts of added fibrils, such as, for example, 10 weight percent.

When the composition contains objects (e.g. spheres) with a uniform coating of the conducting material on them, the composition possesses electrical and/or thermal conductivity. If it is a discontinuous coating, the composition may only possess enhanced thermal conductivity. Thus, heating of the composition may be performed electrically and/or thermally depending on the nature of the composition. Furthermore, if it is done electrically, it may be performed by electrical induction or by passing an electrical current through the material, as will be obvious to those skilled in the art. The heating may also be done by suitable thermal means, or by microwave means.

Any type of wax or polymer material that is suitable for use as the thermally expandable material in an actuator may be used in the present invention. Many such waxes are commercially available as Montan wax, polyethylene wax, polypropylene wax, fluoropolymer wax, wax emulsifiers and the like. Some typical trademarked names for useful waxes are, for example, Hoechst Wachs S, LP, E, HP, PE, NE, Ceridust and many such others (available from Hoechst AG, Frankfurt, Germany). It is also within the scope of this invention to use a suitable mixture of a wax and polymer or polymers as the expandable material.

The temperature and technique for blending the glass spheres into the wax material may vary depending upon the materials used, but the selection of the blending method is well within the ordinary skill in the art.

It is preferred that the composition contains about 10–50% by volume of the hollow spheres. In compositions containing less than 10% by volume spheres, the electrical and thermal conductivity may not be increased significantly, and such compositions may not achieve percolation leading to much higher conductivity, whereas compositions having more than 50% will have such a low proportion of the expandable material that the composition may not expand sufficiently to be useful in the actuator. The skilled practitioner can tailor the composition to achieve a desired combination of conductivities and expansion by thoughtfully selecting the proportion.

Matching of the density of the wax or polymer by the conductive coated spheres when the wax or polymer is in its molten or semi-molten state or during the actuating process is an important and unique advantage of the present inventive compositions. If the densities are not substantially matched, then there is the danger of phase separation of the ingredients during the actuating process. The inventive compositions offer an advantage of such density matching.

The following Examples are presented to illustrate the present invention, but should not be construed as limiting the scope of this invention.

EXAMPLE

A wax made by Hoechst AG., known as Hoechst Wachs ET™, was used to prepare compositions for the conductivity tests. A 3 neck round bottom flask, equipped with a mechanical stirrer, thermometer and inlet and outlet for gas was heated on a heating mantle to about 110° C. 50 grams of Metalite Silver SF-20® hollow glass spheres were added to the flask, followed by 50 grams of the wax. A gentle vacuum was pulled while the wax melted. Upon melting, a slow speed stirring was started. Vacuum was turned off after 2 minutes and replaced with nitrogen gas while stirring was maintained at 110° C. for 5 minutes. Nitrogen was then stopped, and vacuum was applied again for a minute or two, followed by purging with nitrogen for 10 minutes. The mixture was then allowed to cool to ambient temperature. A tan colored smooth-looking solid was obtained which was tested for thermal and electrical conductivity. Upon melting, no sedimentation of the spheres was noticed, demonstrating that the density of the spheres and the wax were substantially matched. The thermal and electrical conductivities were measured by first compression molding the material into a disk using a vacuum press. The molding conditions for making a 2 inch diameter disk with 1 cm thickness were: 1,000 psi, 80° C. and 2 minutes. Using the disk weight and dimensions the density of the molded disk was calculated to be 0.845 gram/cc. The thermal conductivity was measured by the flux method referred-to earlier and found to be 0.3 watts/(meter °C.). In order to measure the electrical conductivity, the disk was cut and the ends of a section approximately 1.2 cm wide by 0.5 cm thick were painted with Fullam® 14811 silver conducting paint (made by Earnest F. Fullam Corporation, Latham, N. Y.). The distance between the painted ends were about 2.0 cm. Measurements were taken with a Beckman Digital Multimeter Tech 310® (made by Beckman Instruments, 2500 Harbor Boulevard, Fullerton, Calif. 92634). From these measurements and the dimensions of the specimen, the volume resistivity was calculated to be 1 ohm-cm.

In order to demonstrate the effect of density matching on phase separation, about 100 grams of the 50/50 Wax E/Metalite Silver SF-20® hollow glass sphere mixture was evaluated by a designed experiment simulating the heating-cooling cycles of a typical piston-driven polymer actuator. The mixture was heated from 40° C. to 120° C. and cooled back to 40° C., repeatedly and continuously, for 10 cycles. At the end of the tenth cycle, the material was evaluated by conductivity measurements and optical microscopy (using a Leitz® optical microscope Model Orthoplan, made by Ernst Leitz, GMBH D-6330, Wetzlar, Germany) for any phase separation and sedimentation. The results showed that the materials remained homogeneous and stable with no signs of phase separation, and no significant affecting of conductivity numbers, thereby demonstrating the unique advantageous aspects of the density-matched wax compositions of the present invention.

Many variations of the present invention not illustrated herein will occur to those skilled in the art. The present invention is not limited to the embodiments illustrated and described herein, but encompasses all the subject matter within the scope of the appended claims.

We claim:

1. An expandable composition for use in actuators comprising about 10–50 volume percent of suitable objects in a thermally expandable material, wherein said suitable objects are selected from the group consisting of hollow spheres, said objects containing an electrically conducting and thermally conducting coating thereon, and wherein said thermally expandable material is a wax, further wherein said objects are capable of generating heat and transmitting heat via said electrical conducting and thermal conducting coating thereby melting said expandable material, and still further wherein said objects and said expandable material do not phase separate in said melt.

2. The composition of claim 1, wherein said hollow spheres are made of glass, metal, ceramic or plastic.

3. The composition of claim 2, wherein said hollow spheres are made of glass.

4. The composition of claim 1, wherein said coating is continuous.

5. The composition of claim 1, wherein said coating is discontinuous.

6. The composition of claim 4, wherein said coating has a thickness range of 0.4–0.7 microns.

7. The composition of claim 1, wherein said spheres have diameters in the range 10 microns–0.5 mm.

8. The composition of claim 1, wherein said conducting coating is selected from the group consisting of gold, silver, copper, carbon and mixtures thereof.

9. The composition of claim 8, wherein said conducting coating is silver.

10. The composition of claim 8, wherein said conducting coating is copper.

11. An expandable composition for use in actuators having a thermal conductivity of at least 0.3 watts/(meter °C.) at about 20°–25° C., which composition comprises about 10–50 volume percent of hollow glass spheres in a wax, wherein said spheres have a diameter of about 10 microns to 0.5 mm and contain a electrically conductive and thermally conductive coating of thickness about 0.4 to 0.7 microns thereon, wherein said spheres are capable of generating heat and transmitting heat via electrical conducting and coating thereby melting said wax, and wherein said spheres and said wax do not phase separate when said wax melts.

12. The expandable composition of claim 11, wherein said conductive coating is selected from the group consisting of gold, silver, copper, carbon and mixtures thereof.

* * * * *